March 11, 1947. L. P. EVANS 2,417,393
APPARATUS FOR HYDROCARBON REACTION
Filed Nov. 4, 1942 4 Sheets-Sheet 1
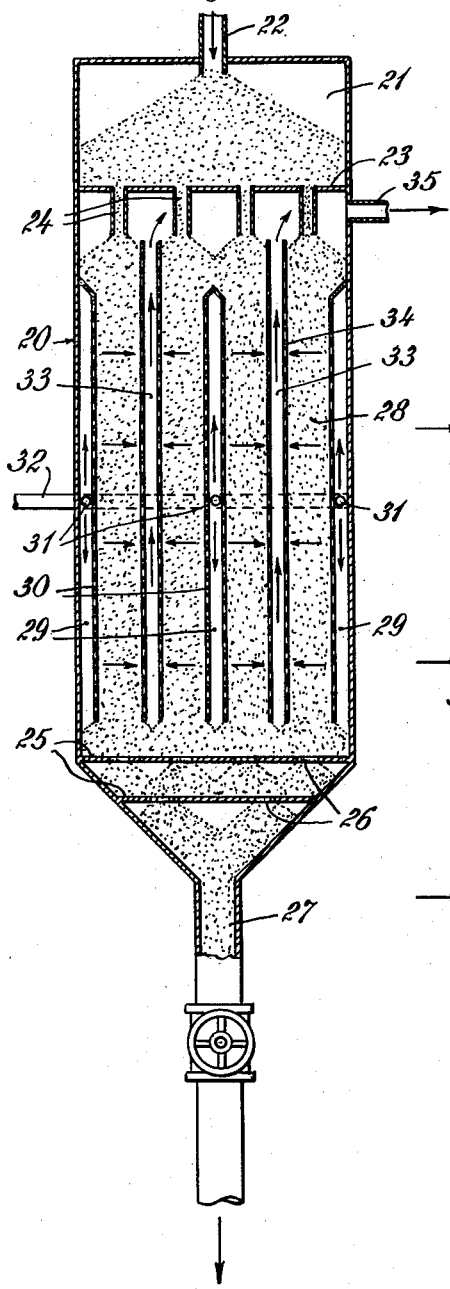
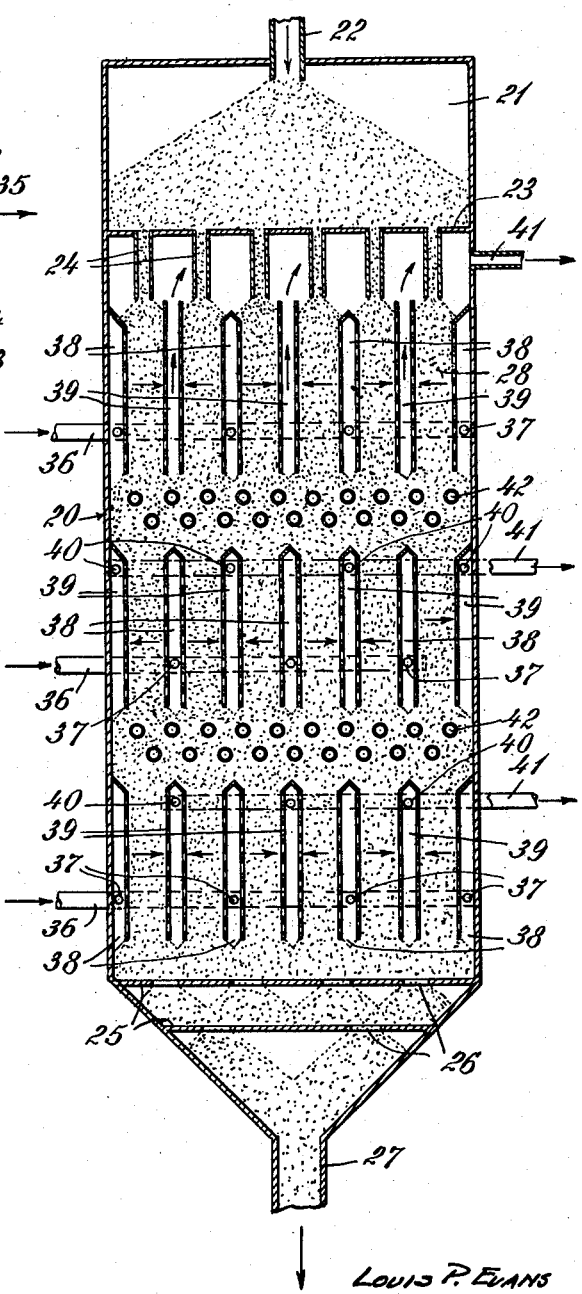
Louis P. Evans
INVENTOR

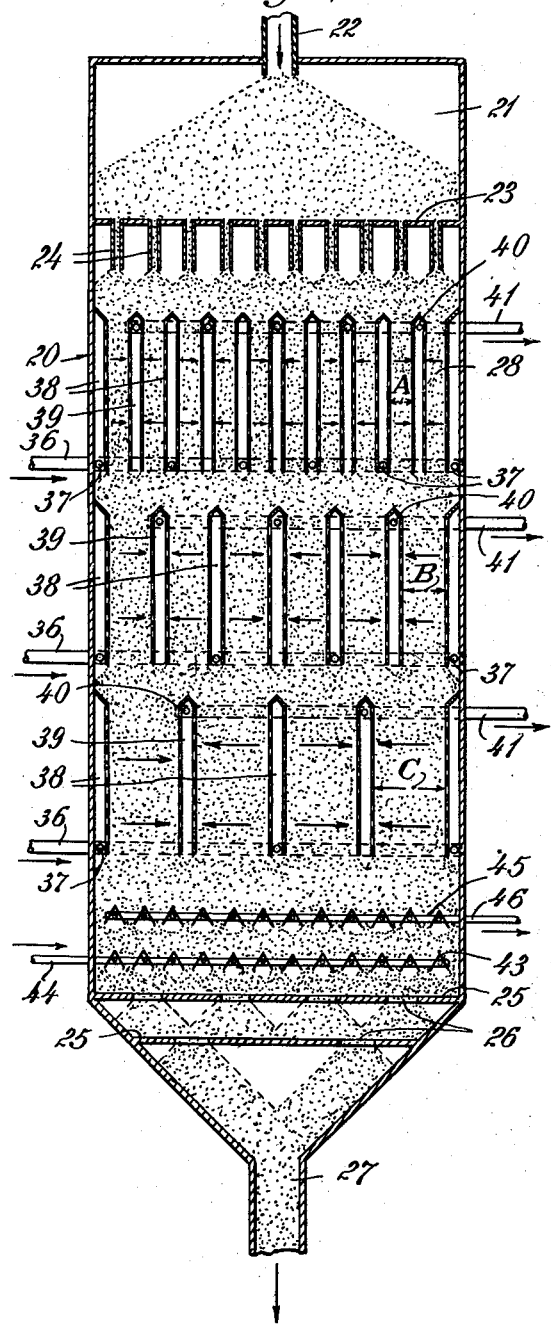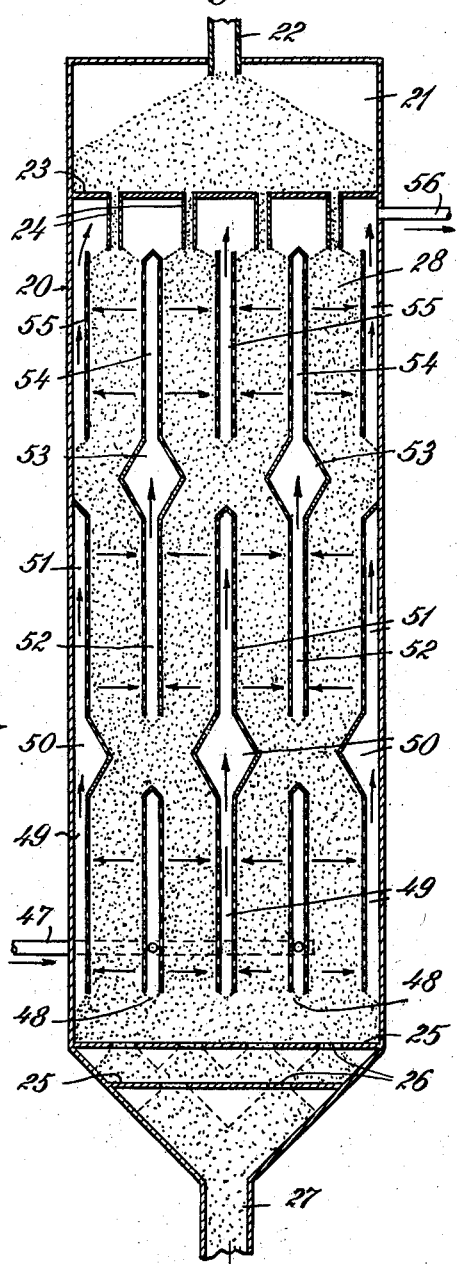

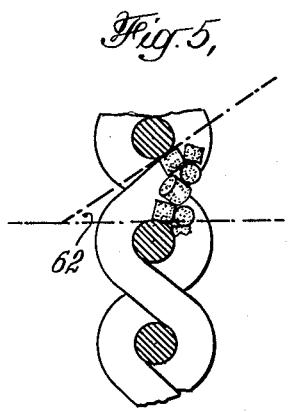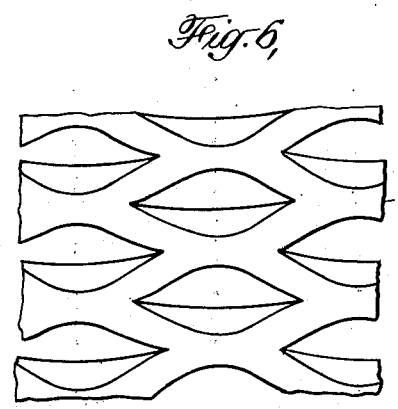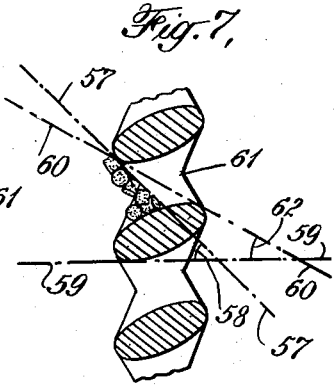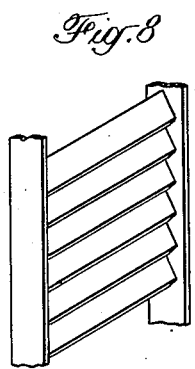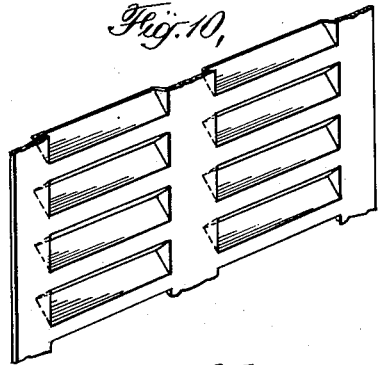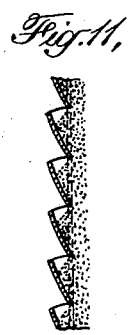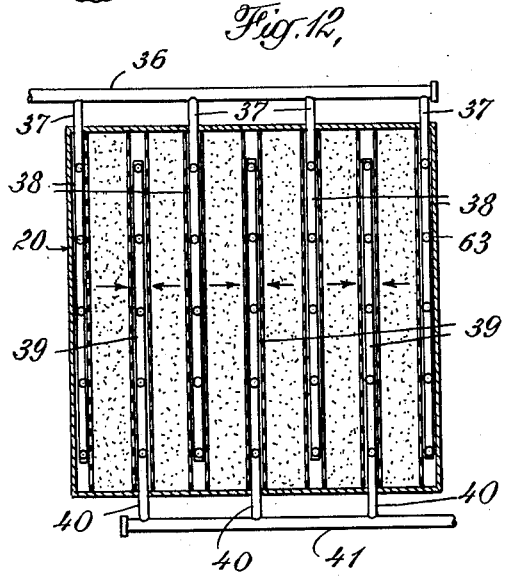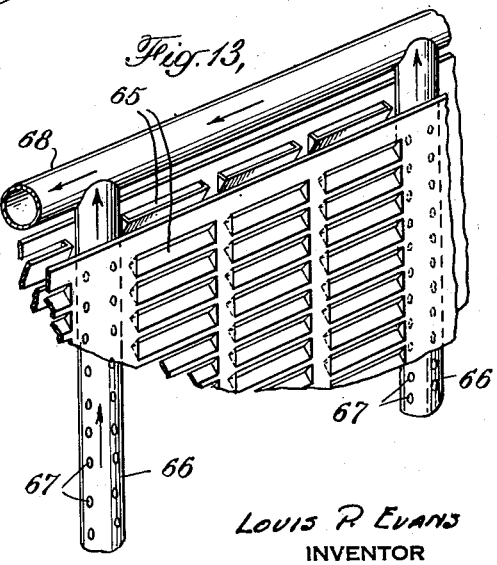

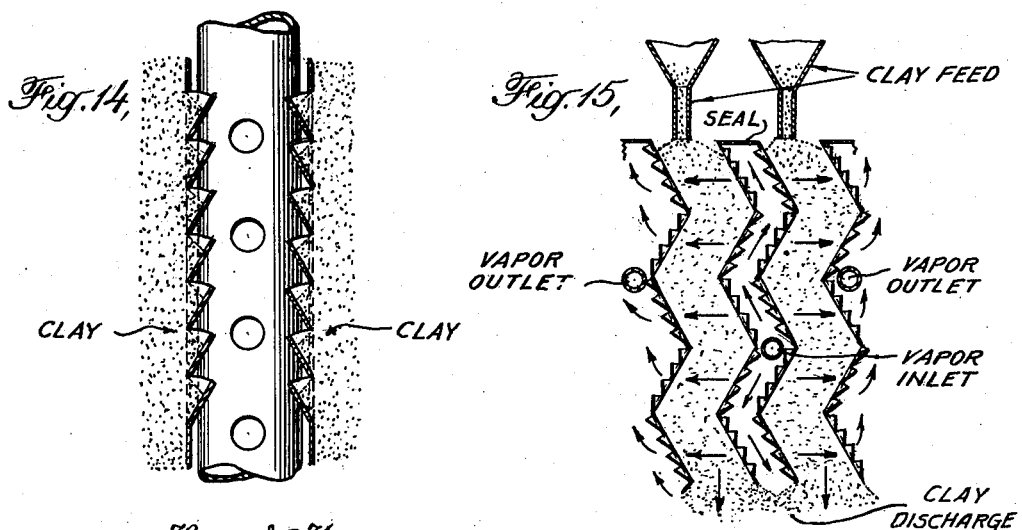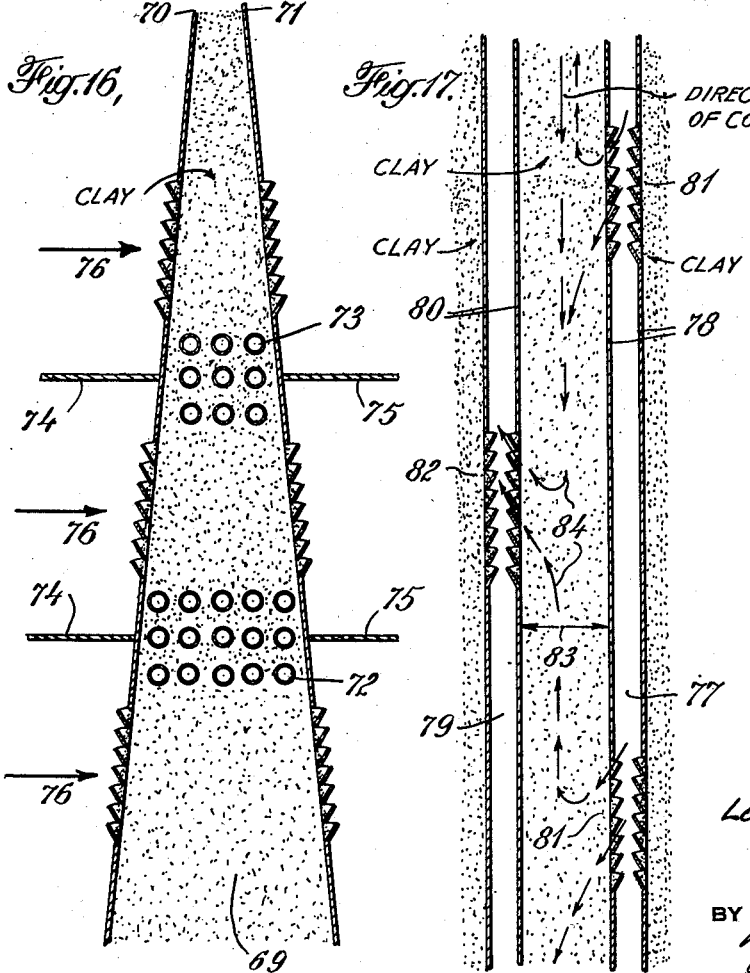

Patented Mar. 11, 1947

2,417,393

UNITED STATES PATENT OFFICE 2,417,393

APPARATUS FOR HYDROCARBON REACTION

Louis P. Evans, Woodbury, N. J., assignor to Socony-Vacuum Oil Company, Incorporated, a corporation of New York Application November 4, 1942, Serial No. 464,547

4 Claims. (Cl. 23—288)

This invention has to do with means for effecting intimate contact between gasi-form reactants, such as, for example, hydrocarbon gases and vapors, and particle-form solid material. It is well known that hydrocarbon vapors may be converted; for example, the vapors of gas oil at appropriate temperatures may be converted to gasoline by passage of those vapors in contact with an appropriate particle-form contact mass material. Such processes are widely known and are exemplified, for instance, in the patents of Eugene Houdry and associates. For example, gas oil vapors at temperatures around 850° F. may be converted to the extent of about 40% or so of gasoline of high anti-knocking capability by passage through a clay like catalyst in pellet form resulting in the deposit upon the clay of contaminating carbonaceous material which is later burned off by a combustion regeneration. Similar processes are utilized to accomplish other conversion purposes such as dehydrogenation, alkylation, isomerization, reforming and other processes of hydrocarbon conversion and also for the effecting of chemical reactions of other kinds such as, for example, the oxidation of naphthalene to phthalic anhydrides.

More recently processes of this type have been developed in which the particle-form solid catalytic material is flowed as a moving bed or column continuously through a zone wherein a reaction is continuously practiced, from thence to a somewhat similar zone in which a regeneration is continuously practiced, from which it returned to the reaction zone. The contact mass materials utilized in these processes partake generally of the nature of clays, that is, they are associations of alumina and silica in various proportions, from various sources, both natural and synthetic, and may or may not have other materials present to exert some effect in the desired reaction. In general, as examples of such materials there may be cited fuller's earth and other natural clays, acid refined natural clays, synthetic clays, co-precipitated gels, and other synthetic materials and any of these may be either catalytic in itself to the desired reaction or may act as a support or carrier for some other material which is catalytic to the desired reaction. In general these materials are utilized in the form of granules obtained by crushing larger masses or as pills, pellets, spheres or rods obtained by pelleting, tableting, extrusion and similar processes.

The present invention has for its object the provision of useful forms of apparatus for effectively securing contact between gasi-form reactants and a moving contact mass composed of particle-form solids.

Its major object is the provision of simple, relatively easily constructed, and accurately working apparatus for such use. It has for other objects the provision of a series of individual but related forms of construction. Among these are the provisions of relatively simple single stage reactors, the provision of multi-stage reactors with differing flow characteristics in various stages, the provision of multi-stage reactors capable of isolation into operating zones of various characteristics and the provision of multi-stage reactors in which simultaneous control of stages and inter-stage control of temperature of reaction occurring therein may be had.

Another object is the provision of a form of construction that may be utilized both in the reactor portion and in the regenerator portion of a cyclic hydrocarbon conversion operation wherein continuously moving particle-form solid contact mass material passes first through a reaction stage in which a hydrocarbon reaction is accomplished with the deposit of contaminant upon the contact mass material, thence to a regeneration zone in which a combustion regeneration is effected to burn the contaminant from the contact mass material and thence is returned to the reaction zone.

Other objects are in part obvious and will in part be pointed out hereinafter. All of these objects are attained by the utilization of certain forms of construction which may be readily understood by reference to the drawings attached to and forming a part of this specification.

In these drawings, Figures 1–4 inclusive, are vertical sections of the various forms of reactors embodying my invention; while Figures 5–17 inclusive, show certain details of construction. In general, this invention is based upon the idea of providing in a moving bed of solid particle-form contact mass material a plurality of vertical passages each defined by properly foraminate walls, arranged substantially in pairs, one member of each pair serving to permit entry of reactant into contact mass while the other permits exit of reaction product from contact mass. The whole of such passages being so arranged as to secure proper and most effective utilization of the whole of the contact mass. The general principle will be most readily apparent from consideration of Figure 1, which represents a comparatively simple form of reactor. This reactor is defined by the shell 20, in the upper end of which there is formed a contact mass hopper 21 to which contact mass material is supplied by pipe 22. In partition 23, defining the bottom of this contact mass hopper, there is a plurality of contact mass feed pipes 24 so arranged as to distribute contact mass material uniformly over the area of the reaction zone extending downwardly inside shell 20 from partition 23 to outlet distributor plates 25, which outlet distributor plates are usually utilized in one or more levels and are so perforated as at 26 in order to permit flow of the contact mass material from the bottom of the reactor while retaining above the uppermost distributor plate 25 a substantially solid moving bed of particle form solid contact mass material. Used contact mass material is removed through pipe 27. Within the body of contact mass material 28 inside the reactor, there are arranged a plurality of vertical spaces 29 extending substantially throughout the height of the reaction zone in a vertical direction, relatively narrow in width in one direction transverse to the reaction zone, and extending throughout the width of the reaction zone in the other dimension. Each of these passages 29 is defined by a foraminate wall 30. Each of these spaces 29 is in communication with an inlet manifold 32. Alternating with each of these vertical spaces 29 are similar vertical spaces 33 which likewise have one relatively small dimension and in the other two directions extend substantially throughout the length and width of the reaction zone and similarly defined by foraminate walls 34. Each space 33 is open at its top into a space above the contact mass material 28 and below the partition 23, to which space pipe 35 communicates. Enclosed between spaces of the series 29 and spaces of the series 33 are vertical columns of downwardly moving contact mass material. In operation gasi-form reactants will be passed in through the inlet pipe 32 and through pipes 31 into the several spaces 29, will then pass out through the foraminate walls of those spaces into the surrounding contact mass material, will pass therefrom through the foraminate walls 34 into spaces 33, thence upwardly to the free space under partition 23 and out of the reactor through the pipe 35.

A generally similar basic form of construction is employed in Figures 2, 3 and 4. In Figure 2, as before, 20 defines the shell of the reactor and 23 the partition at the top thereof. Similarly distributor plates 25 with orifices 26 are found at the bottom of the reactor and serve a similar purpose. However, this reactor is one which has been developed for a reaction such as a regeneration which may be accomplished in stages wherein a corrective heat control must be effected between stages. To this end, it is provided with several groups of parallel vertical spaces defined by foraminate walls. For example, in the lowermost group, we have a reactant inlet manifold 36 communicating through pipes 37 with a series of inlet spaces 38 between which there are placed a series of exits or collector spaces 39, each communicating through a pipe 40 with an exit manifold 41, the whole constituting a single stage of reaction. Above it, there are two other stages essentially similar in design. Between each of these three stages there is a series of heat transfer pipes 42 extending throughout the particle form solid contact mass in the reactor, and these heat transfer tubes are appropriately connected to inlet and outlet manifolds, not shown, whereby a fluid heat exchange medium may be circulated in these tubes in indirect heat transfer relationship with particle-form solid contact mass material surrounding the tubes. In practice, this reactor might be used in an exothermic reaction, such as, for example, a regeneration wherein the extraction of heat at various points in the progress of the regeneration is necessary to prevent overheating and consequent damage of the contact mass material. It will be understood that an effective isolation between stages in this form of reactor results from the fact that the relatively solidly packed contact mass material in the space between stages and surrounding the heat exchange tubes, provides a sufficiently great resistance to the passage of reactants therethrough in proportion to passage from a foraminate inlet means to a corresponding outlet means so that effective isolation between groups or stages may be attained. Where the purpose of operation is merely one of isolation of stages of reaction for various purposes, this feature without the heat exchange tubes may be taken advantage of as in Figure 3.

In Figure 3, again we have 20 the shell of the reactor and 23 the partition defining the top thereof with distributor flow plates 25 having orifices 26 at the bottom thereof. This form of reactor is designed for the purpose of effecting a series of stages of reaction, all in the same reactor, in which stages a varying degree of contact of reactants and of solid contact mass material is attained. In general, the construction of each stage is exactly similar to the construction of the similar stage explained in Figure 2 and the detailed description thereof will not be repeated. It will be noted, however, that in each of the three stages shown the lateral distance through the contact mass between an inlet member and an outlet member is increased, that is, in the first stage at the top of the reactor the reactant must flow through contact mass material a distance represented by the dimension A. In the second stage from the top this distance is the dimension B which is greater than A, and in the third stage it is the dimension C which is greater than B. In other words, we have here a provision whereby with a contact mass material which decreases in activity as it passes downwardly through the reactor, with equal amounts of reactants being flowed through each of the several stages, varying space velocities are achieved in each of the several stages. Variations of this form of construction can be utilized to provide for a relatively complete utilization of contact mass materials with uniform production of reaction products in cases where the contact mass materials vary in activity as they pass through the reaction zone.

Another feature shown in Figure 3 is the use of a purge section at the bottom of the reactor composed of a series of inverted troughs 43 each connected to a pipe 44 through which the purge medium, such as steam, for example, might be introduced, and above this another series of inverted troughs 45 communicating with the pipe 46 and serving to collect and withdraw the purge medium. Another version of the same general proposition of a multi-stage reactor is shown in Figure 4, wherein again 20 represents the shell of the reactor and 23 the partition at the top thereof, 25 the flow plates at the bottom and 26 the orifices therein. It will be remembered that Figure 3 shows the reactor containing a series of parallel stages. The reactor of Figure 4 is one wherein a series of reaction stages is arranged serially, that is, several stages, in each of which a contact of reactant and solid of differing characteristics can be accomplished, are serially arranged so that the reactant flows through all of the stages and the contact mass material moves through all of the stages. One form of accomplishing this is shown in Figure 4, reactants entering through pipe 47 are introduced into distributor spaces 48, passing from thence through contact mass into adjacent collector spaces 49, thus effecting one stage of reaction. These collector spaces 49 extend upwardly through the imperforate middle portion 50 to an upper portion 51, each of which upper portions 51 acts as a distributor for the next stage of the reaction, the gases passing therefrom into the surrounding contact mass and into interspersed collector passages 52, thus effecting another stage of reaction. Passages 52 extend upwardly, pass an imperforate middle section 53 and terminate at their upper ends in the perforate portion 54 which becomes the distributor for this stage of reaction, is alternated with a final series of collectors 55, which lead into the space above the contact mass, reaction products collected therein passing from reactor through pipe 66.

All of these various forms of reactors utilize the principle of vertically extending passages bounded by foraminate walls, which passages serve either to distribute reactants into the contact mass or to collect reaction products therefrom. These foraminate walls may be made of numerous materials. They may be made of wire screen, of expanded metal, and similar materials. They may be made of tipped plate sections arranged very much like a Venetian blind or they may be made of flat metal which has been slitted and indented to provide louvers. Figures 6, 8, and 10 show perspective views respectively of expanded metal, Venetian blind construction and a section of louvered sheet. Figure 5 shows a section transverse to a wire screen. Figure 7 a similar section in expanded metal. Figure 9 a similar section in a Venetian blind construction and Figure 11 a similar section in louver construction. In general, where a louver projects from the plane of the partition, it is preferred that it project into the gas space, rather than into the catalyst space, so that catalyst flow will not be altered. In all of these forms of construction one principle must be observed in order to prevent passage of particle-form solid material through interstices in the foraminate side walls into the reactant distribution and collector passages. That principle is most aptly illustrated in Figure 7, which is a magnified cross section of a piece of expanded metal. In that figure it will be noted that the opening is large enough for a particle to pass therethrough and that the particle-form solid contact mass material has entered into the space between the two parts of the expanded metal and in entry thereinto has followed the law imposed by its own angle of repose to form a surface the slope of which is shown by the line 57—57, the angle of repose being the angle 58 formed between line 57—57 and a horizontal line 59—59. There is also shown in this figure a line 60—60, this line is drawn within the orifice 61 between members of the expanded metal wall in such manner that it is tangent to the upper member at its lowest extremity upon the contact mass side and tangent to the upper extremity of the lower member upon the inner or reactant side. This line 60—60 makes an angle 62 with the horizontal line 59. So long as this angle 62 is less than angle 58, particle-form solid contact mass material will not normally pass through orifice 61 into the foraminate walled reactant passage. The difference between angle 62 and angle 58 will normally be somewhat greater as the size of the particles of the contact mass material decreases. For purposes of definition and claiming this angle 62 is designated as an "angle of entry." The application of this angle of entry to the Venetian blind construction of Figure 9 and the louvre construction of Figure 11 is quite obvious. It is somewhat more obscure in Figure 5 but since a wire mesh material will normally be used which has orifices much smaller in proportion to the size of particles than are the orifices in expanded metal, Venetian blind or louver construction, it has been found by experience that with wire mesh the "angle of entry" might even exceed the angle of repose slightly without excess spillage of clay into the reactant passage. For example 8–10 mesh screen in a vertical position is quite suitable for 20–60 mesh contact mass material.

In plan, the general arrangement of a reactor will be somewhat like that shown in Figure 12 wherein as before, 20 is the shell of the reactor, 36 is the inlet manifold for reactants, 37 designates the pipes by which reactants are led into distributor spaces 38, (all numbered in reference to Figure 2), 41 is the outlet manifold collecting from pipes 40, each of which arises within a collector space 39. Within the distributor spaces 38, pipes 37 are provided with orifices 63. Within the collector spaces 39 collector pipes 40 are provided with orifices 64.

In more extensive structures, the construction may be as shown in a perspective diagram drawing, Figure 13, wherein two louvered flat metal sheets 65 are shown defining a distributor or collector passage between which there are arranged vertically collection pipes 66 provided with orifices 67, which pipes communicate at their upper end with a collector manifold 68. The same construction of course suffices as a distributor section except that the flow of gas in the pipes 66 and 68 would be reversed.

Figure 14 shows, in perspective, a small section of such a reactor taken in cross section adjacent one of the pipes 66.

These distributor and collector spaces need not be defined by vertical walls, in fact, as shown in vertical section in Figure 15, a very efficient form of reactor may be arrived at by so forming the walls defining each of these distributor and collector passages as to provide for the solid contact mass material a zigzag downward path in which the efficiency of the operation appears to be materially increased by the continuous interchange of relative position between contact mass particles. Similarly, in constructions utilizing several stages with varying degrees of contact between reactants and solids in each stage, as in Figure 3, a construction may be utilized such as that diagrammed in Figure 16, which shows in highly diagrammatic form a contact mass passage 69 confined between 70, which is the external wall of the distributing member, and 71, which is the external wall of the collecting member, which passage varies in width from top to bottom. This column of contact mass material is divided into three portions or stages vertically by isolation zones such as those surrounding heat exchange pipes 72 and 73. The distribution zone upon the left will be divided internally into three portions by partitions 74, the collection zone will be similarly divided by partition 75 and thus when similar amounts of reactants are fed in, as shown by arrows 76, we will have three stages of reaction in each of which a greater amount of catalyst is contacted with a similar amount of gas in descending order as in the several stages of Figure 3.

Another interesting feature of this general form of construction arises in connection with the fact that in a moving contact mass material bed of the kind with which we are generally concerned herein, a considerably enhanced degree of reaction is achieved with the gasi-form reactant passing through the moving contact mass material in a path generally parallel to most of the contact mass material rather than in a path which is generally at substantially right angles to the direction of flow of contact mass material. In any of the forms of construction herein shown, this feature can be provided for by enclosing the distributor and collector spaces with walls which are foraminate only at certain points. A form of this construction is that shown in Figure 17, wherein 77 is a distributor member defined by walls 78 and 79 is a collector member defined by walls 80. At intervals along their height walls 78 are provided with foraminate areas 81, located on collector member 79; alternately between these areas 81 there is a foraminate area 82, alternating areas 81 and 82 being spaced from each other vertically so as to provide a generally longitudinal flow of reactants from area 81 to area 82, which flow, in connection with the width of the contact mass passage designated by the dimension 83 between distributor 87 and collector 79, is substantially longitudinal and parallel to the direction of flow of contact mass as indicated generally by the arrows 84.

In most of these constructions, since spillage cannot be completely avoided, the distributor and collector spaces are preferably left open at the bottom, as is clearly shown in the drawings, in order that contact mass material adventitiously spilled into them may return to the flowing stream of contact mass material.

I claim:

1. In an apparatus of the kind described, a shell enclosing a reaction zone, inlet means to feed particle-form solid contact mass thereto and outlet means to remove it therefrom, within said reaction zone a plurality of vertical partitions disposed in pairs, the members of each pair being arranged to provide gas spaces therebetween and the pairs of partitions being arranged to provide passages therebetween wherein contact mass may flow, means adjacent the upper ends of said partitions to exclude flow of solid material into said gas spaces, gaseous reactant inlet means communicating with certain of said gas spaces, gaseous reactant outlet means communicating with the remainder of said gas spaces, said space-defining partitions having therein foraminate areas whereby gaseous reactant may flow from reactant inlet means into contact mass and from contact mass to reactant outlet means, said foraminate areas being adapted to substantially exclude flow of said contact material particles into said gas spaces, wherein the contact mass passages lying between such pairs of partitions are of substantial length in proportion to their width and wherein the reactant-outlet foraminate areas are spaced away from the reactant-inlet foraminate areas so that the flow of gaseous reactant through the column of solid is substantially parallel to the direction of motion of the column.

2. In an apparatus of the kind described, a shell adapted to enclose a reaction zone, means to feed particle-form solid to the upper end thereof, means to remove solid from the bottom end thereof, and within said shell at least two groups of gaseous reactant handling devices spaced serially along the vertical dimension of said shell with each group constituting a single reaction stage within said zone; each group of reactant handling devices comprising a plurality of vertically placed partitions disposed in pairs to define between the members of each pair a gas space while providing adjacent each pair a channel for the downward flow of solid, means adjacent the upper ends of said partitions to exclude flow of solid particles into said gas spaces, inlet means for gaseous reactant communicating with the gas spaces within some of the pairs of partitions, outlet means for gaseous reactant communicating with the gas spaces within the remaining pairs of partitions, said partitions having foraminate areas therein to provide for flow of gaseous reactant therethrough; in which the width of the channels adapted to be filled with solid is greater in any group than in the group next above, the length of such channels being substantially equal in all groups.

3. In an apparatus of the kind described, a shell adapted to enclose a reaction zone, means to feed particle-form solid to the upper end thereof, means to remove solid from the bottom end thereof, and within said shell at least two groups of gaseous reactant handling devices spaced serially along the vertical dimension of said shell with each group constituting a single reaction stage within said zone; each group of reactant handling devices comprising a plurality of vertically placed partitions disposed in pairs to define between the members of each pair a space maintained free of solid particles while providing adjacent each pair a channel for the downward flow of solid, means adjacent the upper ends of said partitions to exclude solid particle flow from said solid-free spaces, inlet means for gaseous reactant communicating with the solid-free spaces within some of the pairs of partitions, outlet means for gaseous reactant communicating with the solid-free spaces within the remaining pairs of partitions, said partitions having foraminate areas therein such as to provide for flow of gaseous reactant therethrough and such as to substantially exclude solid particle flow therethrough; in which the volume of the channels adapted for downward flow of solid material is greater in any group than in the group next above.

4. In an apparatus of the kind described, a shell adapted to enclose a reaction zone, means to feed particle-form solid to the upper end thereof, means to remove solid from the bottom end thereof, and within said shell at least two groups of gaseous reactant handling devices spaced serially along the vertical dimension of said shell with each group constituting a single reaction stage within said zone; each group of reactant handling devices comprising a plurality of vertically placed partitions disposed in pairs to define between the members of each pair a gas space while providing adjacent each pair a channel for the downward flow of solid means adjacent the ends of said partitions to exclude flow of said solid into said gas spaces; in which some of said space defining pairs of partitions extend vertically throughout two adjacent groups and are common to both and in which the remaining non-common pairs of space defining partitions in successive groups are vertically spaced, one from another, by a vertical distance substantially greater than the transverse width of any solid filled channel in an adjoining group, in one group inlet means for gaseous reactant communicating with the solid-free space within each of the non-common partition pairs, in the adjacent group outlet means for gaseous reactant communicating with the non-common partition pairs in that group, said partitions having foraminate areas therein adapted for free gas flow therethrough while substantially excluding the flow of solid particles therethrough, the foraminate areas in those partitions which extend vertically throughout two adjacent groups being located only at the levels of the adjacent groups so as to provide substantial vertical lengths of gas impervious partitions through the levels between adjacent groups.

LOUIS P. EVANS.

REFERENCES CITED

The following references are of record in the file of this patent:

UNITED STATES PATENTS

| Number | Name | Date |
|---|---|---|
| 1,995,292 | Clark | Mar. 26, 1935 |
| 575,468 | Ewing | Jan. 19, 1897 |
| 2,265,837 | Harding | Dec. 9, 1941 |
| 1,784,626 | Hammill | Dec. 9, 1930 |

FOREIGN PATENTS

| Number | Country | Date |
|---|---|---|
| 645,654 | France | July 3, 1928 |
| 41,572 | German | Dec. 5, 1887 |
| 459,306 | German | May 4, 1928 |